United States Patent [19]
> Hann et al.

[11] Patent Number: 4,530,766
[45] Date of Patent: Jul. 23, 1985

[54] METHOD OF INHIBITING SCALING IN AQUEOUS SYSTEMS WITH LOW MOLECULAR WEIGHT COPOLYMERS

[75] Inventors: William M. Hann, Pennsburg; John Natoli, Ambler, both of Pa.

[73] Assignee: Rohm and Haas Company, Philadelphia, Pa.

[21] Appl. No.: 653,998

[22] Filed: Sep. 24, 1984

Related U.S. Application Data

[63] Continuation-in-part of Ser. No. 485,560, Apr. 15, 1983, abandoned.

[51] Int. Cl.³ ................................................ C02F 5/10
[52] U.S. Cl. .............................. 210/701; 106/308 Q; 252/180; 501/148
[58] Field of Search .......................... 106/308 Q; 209/5; 210/698–701; 252/180, 181; 501/148

[56] References Cited

U.S. PATENT DOCUMENTS

| | | | |
|---|---|---|---|
| 3,578,589 | 5/1971 | Hwa et al. | 210/701 |
| 3,699,048 | 10/1972 | Krueger et al. | 210/701 |
| 3,791,978 | 2/1974 | Krueger et al. | 252/180 |
| 3,890,228 | 6/1975 | Hwa et al. | 210/699 |
| 4,008,164 | 2/1977 | Watson et al. | 252/180 |
| 4,186,027 | 1/1980 | Bell et al. | 106/308 Q |
| 4,301,266 | 11/1981 | Muenster et al. | 526/212 |
| 4,314,004 | 2/1982 | Stoneberg | 428/421 |
| 4,326,980 | 4/1982 | Snyder et al. | 210/701 |

FOREIGN PATENT DOCUMENTS

| | | | |
|---|---|---|---|
| 53-2393 | 1/1978 | Japan | 252/180 |
| 53-21091 | 2/1978 | Japan | 252/180 |
| 1414964 | 11/1975 | United Kingdom | 210/701 |
| 604866 | 4/1978 | U.S.S.R. | 501/148 |

Primary Examiner—Peter Hruskoci
Attorney, Agent, or Firm—Marc S. Adler

[57] ABSTRACT

A method for inhibiting scale formation in aqueous systems using water-soluble, low molecular weight copolymers of unsaturated aliphatic carboxylic acids is provided. Copolymers formed from about 30 to about 70 weight percent acrylic acid and from about 70 to about 30 weight percent methacrylic acid, having a weight average molecular weight ranging from about 2000 to about 5000, are preferred for inhibiting the formation of common hardness ion salt scale such as calcium carbonate, calcium phosphate and barium sulfate. The copolymers are hydrolytically stable and can be used effectively in high temperature applications. The copolymers are also effective dispersants for suspended inorganic particulate materials, such as clay, in aqueous systems.

11 Claims, 2 Drawing Figures

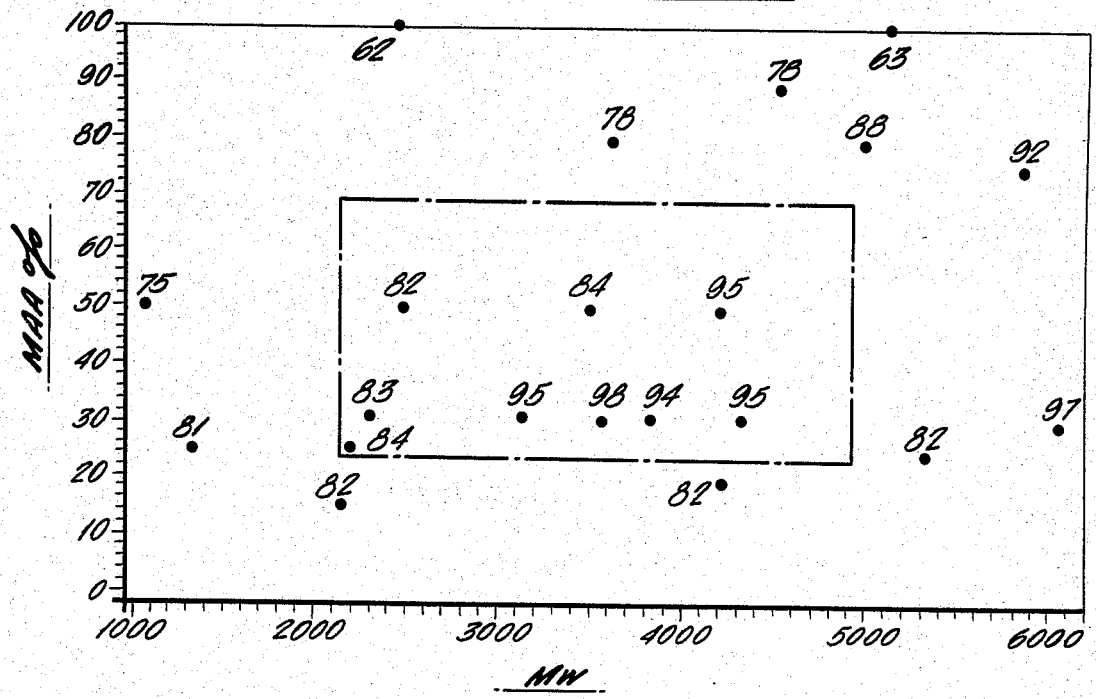
Fig. 1. CALCIUM CARBONATE PRECIPITATION INHIBITION AS A FUNCTION OF AA/MAA RATIO AND MW
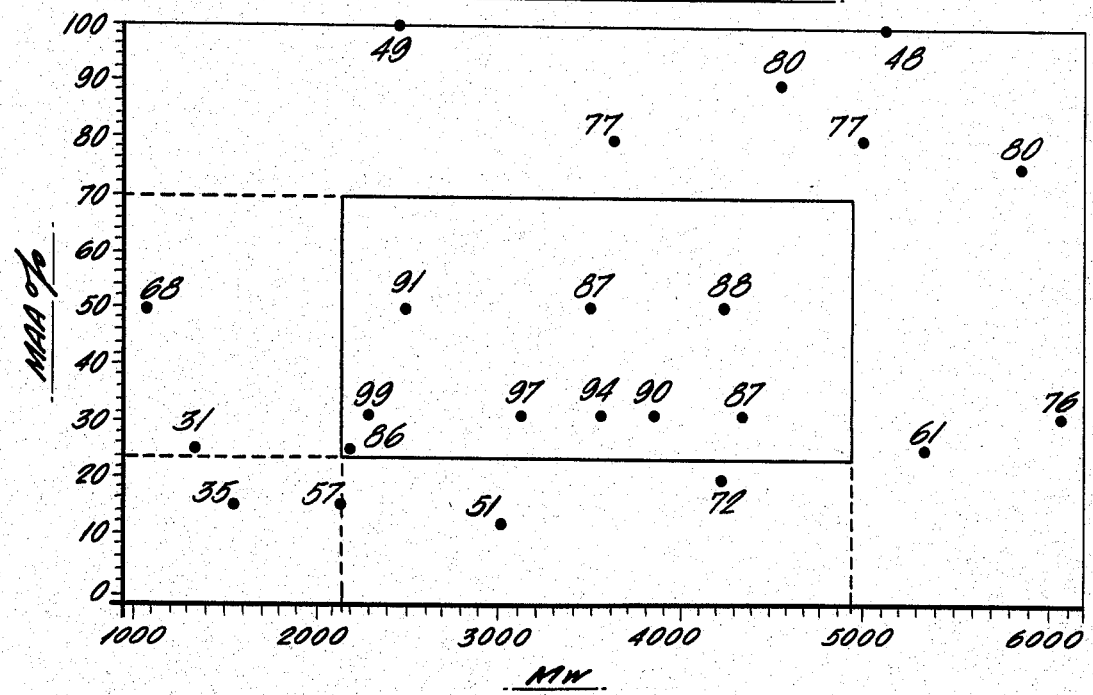
Fig. 2. CALCIUM PHOSPHATE PRECIPITATION INHIBITION AS A FUNCTION OF AA/MAA RATIO AND MW

METHOD OF INHIBITING SCALING IN AQUEOUS SYSTEMS WITH LOW MOLECULAR WEIGHT COPOLYMERS

BACKGROUND OF THE INVENTION

This is a continuation-in-part of U.S. patent application Ser. No. 485,560 filed on Apr. 15, 1983 now abandoned.

FIELD OF THE INVENTION

This invention relates to the use of low cost, low molecular weight, water-soluble copolymers of unsaturated aliphatic carboxylic acids to inhibit the formation of inorganic scale in aqueous systems. More particularly, the invention relates to a method of effectively inhibiting and dispersing calcium carbonate, barium sulfate and calcium phosphate precipitation in aqueous systems using copolymers formed from about 30 to about 70 weight percent acrylic acid and from about 70 to about 30 weight percent methacrylic acid, where the resulting copolymer has a molecular weight ranging from about 2000 to 5000 weight average molecular weight.

DESCRIPTION OF THE PRIOR ART

Many industrial applications and many residential areas of the world utilize water containing relatively high concentrations of inorganic salts formed by the reaction of calcium and magnesium ("hardness") ions with such anions as carbonate, phosphate, and sulfate. These salts have low solubility in water, and this low solubility decreases still further as pH and temperature are increased. When the concentration of these hardness ion salts in water exceeds their solubility, they tend to precipitate from solution. Calcium carbonate, formed from the natural breakdown of calcium bicarbonate present in most hard water, is the most common inorganic salt precipate found in aqueous systems. When calcium carbonate, and other inorganic salts, precipitate from an aqueous solution, they crystallize and form hard mineral deposits, known as scale, on the surfaces of boilers, heat transfer devices, and the like. For example, in cooling water systems utilizing recirculating water having a cooling tower and a heat exchanger, evaporation of the water will cause the inorganic salts to precipitate from solution, forming scale on the hot surface of the heat exchanger. This scale reduces the heat transfer efficiency and throughput of the exchanger while increasing maintenance costs and down-time associated with the cleaning of these surfaces. Precipitation of hardness ion salts and their resulting scale formation is also a problem in boilers, secondary oil recovery wells utilizing water flooding techniques, and clothes washing machines. Precipitation of hardness ion salts may also result in incrustation on clothes washed with hard water.

In addition to scaling problems, cooling water systems and boilers constructed of carbon steel also experience corrosion problems caused by the presence of dissolved oxygen. In the past, this corrosion problem was combated using chromate compounds; however, as the result of associated toxicity problems chromates have been replaced by inorganic orthophosphate compounds. The use of these compounds, however, adds to scale formation by the precipitation and deposition of highly insoluble calcium phosphate.

In addition to scaling problems, cooling water systems and boilers constructed of carbon steel also experience corrosion problems caused by the presence of dissolved oxygen. In the past, this corrosion problem was combated using chromate compounds; however, as the result of associated toxicity problems, chromates have been replaced by inorganic orthophosphate compounds. The use of these compounds, however, adds to scale formation by the precipitation and deposition of highly insoluble calcium phosphate.

Scale inhibition can be accomplished by one or a combination of three basic mechanisms. The first mechanism involves the ability of an inhibitor compound to delay the precipitation of hardness ion salts from solution. This mechansim, referred to herein as anti-precipitation, involves limiting the size of the precipitated hardness ion salts to sub-colloidal dimensions. It is hypothesized that the scale inhibitor adsorbs onto the growing salt crystal soon after its nucleation. The presence of the scale inhibitor on the surface of the nuclei interfers with further crystal growth by blocking potential sites for crystal growth. The second mechanism involves the ability of the scale inhibotor to disperse precipitated crystals of the hardness ion salts. This mechanism, referred to herein as dispersion, is believed to take place by the adsorption of the scale inhibitor on the precipitated salt crystals, imparting a highly electronegative charge to the crystals, which retards agglomeration, settling, and deposition of the crystals on surfaces by virtue of repulsive forces. In addition, the scale inhibitor can adsorb onto other particulate matter in the water, such as suspended particles of mud or silt with similar dispersion effect, thus allowing the treated particles to be more easily removed from the sytem. The third mechanism involves the ability of the scale inhibitor to interfere with and distort the regular crystal structure of the scale. By interfering with the crystal lattice, the scale inhibitor makes the scale more easily fracturable and dispersable. This mechanism is referred to herein as crystal modification.

Many compounds have been developed and are being used with varying degrees of success to inhibit scale formation caused by hardness ion salts in water systems. These compounds have not been completely satisfactory in their performance or cost. Some compounds are not effective at low use levels or in high pH or high temperature environments and none have been found to be completely satisfactory for inhibiting various types of common hardness ion salt scale. Some have been found to be effective for inhibiting the precipitation of calcium carbonate but not for calcium phosphate and others that have been found to be effective for inhibiting the precipitation of calcium phosphate, under some conditions, have not been found to be effective for calcium carbonate. It would, therefore, be desirable if one scale inhibitor could be useful for inhibitng the precipitation of these common hardness ion salts in aqueous solutions containing one or more of them. This would enable an operator to simply use a single scale inhibitor regardless of the hardness ion salt or salts present in the system to be controlled.

The known scale inhibitors include naturally occurring compounds, such as lignin derivatives, inorganic or organic phosphates, polyacrylates, combinations thereof, and compositions containing other compounds in combination with the above. The art, however, has not found a low cost effective scale inhibitor which is highly effective for general use in aqueous systems.

U.S. Pat. No. 3,578,589 is directed to a method for treating cooling water deposits using a nonionic surfactant and an acrylic acid or methacrylic acid polymer, salts thereof, or copolymers of such salts having a molecular weight greater than 400. Copolymers formed from equal molar ratios of the sodium salt of acrylic acid and methacrylic acid having a molecular weight ($\overline{Mw}$) of 70,000, is illustrated as being effective with the surfactant for treating deposits such as calcium carbonate and calcium sulfate, but not calcium phosphate.

U.S. Pat. No. 4,008,164 is directed to scale inhibition of calcium sulfate and carbonate and mixtures thereof using a copolymer of acrylic acid and methylacrylate. A molar excess of at least 3:1 acrylic acid to methylacrylate, and preferably 4:1 to 5:1, is required. The copolymer formed has a molecular weight ranging from 1000 to 25,000, with a preferred range of 6000 to 8000.

Canadian Pat. No. 1,097,555 attempts to solve a deficiency in the art, and in particular U.S. Pat. No. 4,008,164, for inhibiting barium sulfate scale as well as calcium sulfate and calcium carbonate by the use of a copolymer of acrylic acid and methacrylic acid having a molecular weight ranging from 1,000 to 25,000. As in U.S. Pat. No. 4,008,164, this copolymer requires a molar excess of acrylic acid over methylacrylate of at least 3:1 (71.5 weight percent acrylic acid:28.5 weight percent methylacrylate as methacrylic acid) and preferably 4:1 to 5:1. As in the U.S. Pat. No. 4,008,164, the Canadian patent is silent regarding the ability of such a copolymer to inhibit calcium phosphate scale.

German Offenlegungsschrift No. 2,344,498 is directed to a process for preventing corrosion and deposits in cooling water coils by the use of a mixture of phosphates or polyphosphates, zinc salts and polyacrylates, polyacrylic acid derivatives, or copolymers of acrylic acid and methacrylic acid, or alkyl acrylates or methacrylates whose alkyl chain contains less than twelve carbon atoms. The composition of the monomers used to form the copolymers is not disclosed, and the only operable copolymer exemplified is a copolymer of acrylic acid and isopropyl acrylate having a molecular weight of about 20,000, although molecular weights of between 200 and 500,000 are disclosed.

U.S. Pat. No. 4,029,577 relates to a process for controlling the formation of scale and calcium phosphate, in particular, by the use of copolymers of acrylic acid, and derivatives thereof, and hydroxylated lower alkyl acrylates, in a molar ratio of 34:1 to about 1:4, where the copolymers have molecular weights ranging from 500 to 1,000,000.

U.S. Pat. No. 4,303,568 is directed to a method and composition for corrosion inhibition containing an orthophosphate and a copolymer of acrylic acid or lower alkyl acrylic acid, and salts thereof, with a hydroxylated lower alkyl ($C_2$–$C_6$) acrylate, in a molar ratio of acrylic acid to hydroxylated acrylate of 1:4 to 36:1. The copolymer is disclosed as having a low molecular weight ranging from about 1000 to 5000.

Other patents which relate to the use of acrylic acid copolymers include U.S. Pat. Nos. 2,205,822; 2,783,200; 3,085,916; 3,293,152; 3,766,077; 3,579,455; 3,663,448; 3,699,048; 4,004,939; 4,209,398; Canadian Pat. No. 1057943 and European Pat. No. 0018083. None of these references, however, discloses that low molecular weight and a specific range of copolymer compositions are desirable or necessary to effectively inhibit scale formation, and particularly calcium phosphate scale formation, in aqueous systems.

It is well known that Rohm and Haas Company's Acrysol® LMW polymers of polyacrylic acid and their corresponding sodium salts, having a molecular weight range of from about 1000 to about 4500, are highly effective scale inhibitors in aqueous systems for inhibiting common hardness ion salts, such as calcium carbonate, calcium sulfate, and barium sulfate. These homopolymers have, however, not been found to be highly effective for calcium phosphate scale inhibition. At the present time, the most effective commercial calcium phosphate scale inhibitors are copolymers of acrylic acid and hydroxylated lower alkyl-substitued methacrylates and acrylates, such as hydroxyethyl methacrylate, hydroxypropyl methacrylate, and hydroxypropyl acrylate. These copolymers, however, have been found to be less than completely effective for inhibiting calcium carbonate scale in aqueous systems. In addition, these copolymers historically have higher raw material costs than polyacrylic homopolymers and are susceptible to hydrolysis at the high temperature and pH conditions present in boilers.

The foregoing exemplifies numerous prior attempts to inhibit scale formation in aqueous systems using a variety of compounds, compositions, and mixtures. These attempts clearly show that neither the molecular weight nor the ratio of the monomer concentrations used to form copolymeric inhibitors was previously recognized as being critical for effective scale inhibition in aqueous systems.

SUMMARY OF THE INVENTION

We have unexpectedly found that hardness ion salt scale, and particularly calcium carbonate, barium sulfate and calcium phosphate scale, can be effectively inhibited in aqueous systems by the incorporation of small quantities of low cost, low molecular weight, water-soluble copolymers of acrylic acid and methacrylic acid where the copolymers are formed from a specific range of monomer concentrations, namely, from about 30 to about 70 weight percent acrylic acid and from about 70 to about 30 weight percent methacrylic acid, and where the copolymers thus formed have a weight average molecular weight ranging from about 2000 to about 5000.

In addition, we have found that these novel copolymers are effective anti-precipitants and dispersants in aqueous systems containing common hardness ion salts and that these copolymers are unexpectedly superior to the known polymeric scale inhibitors.

Furthermore, we have also found that these copolymeric scale inhibitors are hydrolytically stable at elevated pH and temperature thereby allowing their use in high temperature applications such as internal boiler water treatment.

Still further, we have found that these copolymers are effective dispersants for inorganic particulate materials suspended in aqueous systems.

BRIEF DESCRIPTION OF THE FIGURES

FIGS. 1 and 2 are graphical illustrations of the effect of the acrylic and methacrylic acid copolymers in inhibiting the precipitation of calcium carbonate and calcium phosphate as a function of the molecular weight of the copolymers and the concentration of the monomers used to form the copolymers.

DETAILED DESCRIPTION OF THE INVENTION

The method of the present invention for hardness ion salt scale inhibition requires the addition of certain low molecular weight, water-soluble copolymers of acrylic acid and methacrylic acid to aqueous systems. The following describes various methods for synthesizing these copolymers.

COPOLYMER SYNTHESIS

In general, the prior art discloses several suitable synthesis methods for preparing low molecular weight copolymers of acrylic acid and methacrylic acid.

U.S. Pat. No. 4,314,004 is directed to one suitable copolymer synthesis method and the disclosure thereof is incorporated herein by reference. This method requires a specific concentration range of a copolymerization initiator and a specific molar ratio range of the initiator concentration and the concentration of certain metal salts to obtain the desired low molecular weight copolymers useful in the present invention. The preferred copolymerization initiators are peroxide compounds such as ammonium persulfate, potassium persulfate, hydrogen peroxide and t-butyl hydroperoxide. The preferred concentration range of the initiator is between about 1 to about 20 weight percent based on the weight of monomers. The metal salts used to regulate molecular weight preferably include cuprous and cupric chloride or bromide, cupric sulfate, cupric acetate, ferrous and ferric chloride, ferrous sulfate and ferric and ferrous phosphate. The molar ratio of the copolymerization initiator to the metal salt is preferably between about 40:1 to about 80:1. The copolymers of acrylic acid and methacrylic acid useful in this invention are preferably prepared in water at a copolymer concentration of about 40 to about 50 percent based on total weight of solution.

Another method useful to prepare these low molecular weight copolymers is described in U.S. Pat. No. 4,301,266, the disclosure thereof also being incorporated herein by reference. In this process isopropanol is used as the molecular weight regulator as well as the reaction solvent. The reaction solvent may also be an aqueous mixture of isopropanol containing at least 40 weight percent isopropanol. The copolymerization initiator is a free radical initiator such as hydrogen peroxide, sodium persulfate, potassium persulfate, or benzoyl peroxide. The copolymerization is carried out under pressure at a temperature of 120° to 200° C. The concentration of the copolymer in the solvent is preferably 25 to 45 percent based on the weight of the total solution. When copolymerization is complete, the isopropanol is distilled from the reactor and the copolymer may be neutralized with a base.

Still another method for preparing low molecular weight copolymers useful in this invention s described in U.S. Pat. No. 3,646,099, the disclosure thereof also being incorporated herein by reference. This process is directed to the preparation of cyanocontaining oligomers; however, it is also applicable for preparing low molecular weight copolymers useful in the present invention. This process employs a bisulfite salt as the copolymerization molecular weight regulator and the resulting copolymers prepared thereby are sulfonate terminated. The preferred bisulfite salt is sodium bisulfite at a concentration of between 5 and 20 weight percent based on the weight of monomers. The free radical copolymerization initiator is ammonium, sodium or potassium persulfate, hydrogen peroxde or t-butyl hydroperoxide. The preferred concentration of the initiator is between 0.2 and 10 weight percent based on monomers. The polymerization temperature is preferably between 20° and 65° and the concentration of the copolymers in the aqueous solvent is between 25 and 55 weight percent based on total solution weight.

EVALUATION OF COPOLYMERS

A wide range of copolymers of acrylic acid and methacrylic acid were prepared from about 10 to about 90 weight percent acrylic acid monomer and from about 90 to about 10 weight percent methacrylic acid. The molecular weight of these copolymers was also varied from about 1,000 to about 10,000 weight average molecular weight, based on polyacrylic acid polymer standards, as determined by standard aqueous gel permeation chromatographic techniques.

Each of the copolymers prepared was separately evaluated for its ability to inhibit the formation of calcium carbonate and calcium phosphate scale. The first mechanism of scale inhibition evaluated using these copolymers was that of anti-precipitation. The following standard test methods were employed.

CALCIUM CARBONATE ANTI-PRECIPITATION TEST

The following test method was employed to measure the ability of the copolymers to inhibit calcium carbonate precipitation in aqueous systems.

Two stock solutions (Stock Solution 1 and Stock Solution 2) were prepared and were filtered through a 0.45 micrometer Millipore filter.

| Stock Solution 1 | Stock Solution 2 |
| --- | --- |
| 2.10 g/l $CaCl_2$ | 1.00 g/l $Na_2CO_3$ |
| 2.04 g/l KCl | 2.04 g/l KCl |
| 4.97 g/l $MgCl_2.6H_2O$ | 4.97 g/l $MgCl_2.6H_2O$ |
| 76.68 g/l NaCl | 76.68 g/l NaCl |

To a 4 ounce jar was added 50 ml of Stock Solution 1, followed by 3 ml of 0.1% concentration of copolymer in water at a pH of 8 (30 ppm), followed by 50 ml of Stock Solution 2. The jar was then sealed and placed in a rolling oven at 70° C. for sixteen hours. The sample was then removed from the oven and allowed to cool for one hour. The sample was then filtered through a 0.45 micrometer Millipore filter and was analyzed for divalent calcium ion concentration using EDTA titration. The results of this test are shown on Table 1 and graphically on FIG. 1. The percent anti-precipitation was determined by dividing the actual concentration of calcium ion in the treated sample by the known, initial concentration of calcium ion and multiplying the resulting fraction by 100.

CALCIUM PHOSPHATE ANTI-PRECIPITATION TEST

The calcium phosphate anti-precipitation activity of each of the copolymers was determined by the following test. To a 0.4 ounce jar was added 50 ml of 500 ppm calcium chloride, calculated as calcium carbonate, 1.0 ml (10 ppm) or 0.75 ml (7.5 ppm) of a 0.1 weight percent concentration of copolymer in water, and 50 ml of 12 ppm dibasic sodium phospate ($Na_2HPO_4$) as trivalent phosphate anion. The solution was adjusted to a pH of 8.5 using diluted (1%) sodium hydroxide. This pH was chosen as representative of the upper pH limit actually encountered in cooling water systems. The jar was sealed and placed in an oven at 70° C. for seventeen hours. The jar was then removed from the oven and the solution was immediately filtered through a 0.22 micrometer Millipore filter. The solution was then allowed to cool to room temperature and 30 ml of the solution was diluted with deionized water to make a 100 ml diluted solution. This diluted solution was then spectrophotometrically analyzed for trivalent phosphate anion concentration using the standard Abscorbic Acid Method (APHA Standard Methods, 13th ed. 535 (1971)) using a Hach Spectrophotometer at 700 nm and Phosver III phosphate reagent. The results of this test are also presented on Table 1 and in FIG. 2 (7.5 ppm). The percent calcium phosphate precipitation inhibition was determined analogously to the percent calcium carbonate precipitation inhibition described above.

TABLE 1

| Example | Acrylic Acid Monomer Wt % | Methacrylic Acid Monomer Wt % | Copolymer $M\overline{w}$ | % Precipitation Inhibition | | |
|---|---|---|---|---|---|---|
| | | | | Calcium Carbonate 30 ppm | Calcium Phosphate 7.5 ppm | 10 ppm |
| 1 | 10 | 90 | 4550 | 78 | 80 | 85 |
| 2 | 11 | 89 | 10500 | — | — | 56 |
| 3 | 20 | 80 | 5000 | 88 | 77 | — |
| 4 | 20 | 80 | 3620 | 78 | 77 | — |
| 5 | 25 | 75 | 5860 | 92 | 80 | 65 |
| 6 | 50 | 50 | 4220 | 95 | 88 | 98 |
| 7 | 50 | 50 | 3500 | 82 | 87 | — |
| 8 | 50 | 50 | 2500 | 82 | 91 | — |
| 9 | 50 | 50 | 1080 | 75 | 68 | 88 |
| 10 | 69 | 31 | 2300 | 83 | 99 | — |
| 11 | 69 | 31 | 3130 | 95 | 97 | — |
| 12 | 69 | 31 | 3580 | 98 | 94 | — |
| 13 | 69 | 31 | 3830 | 94 | 90 | — |
| 14 | 69 | 31 | 4330 | 95 | 87 | — |
| 15 | 69 | 31 | 6080 | 97 | 76 | — |
| 16 | 69 | 31 | 8810 | 94 | 43 | — |
| 17 | 75 | 25 | 5320 | 82 | 61 | 55 |
| 18 | 75 | 25 | 2200 | 84 | 86 | — |
| 19 | 75 | 25 | 1320 | 81 | 31 | — |
| 20 | 80 | 20 | 4230 | 82 | 72 | — |
| 21 | 85 | 15 | 2160 | 82 | 57 | — |
| 22 | 85 | 15 | 1560 | — | 35 | — |
| 23 | 88 | 12 | 3020 | — | 51 | — |
| Control | No Polymer | | — | 57 | 6 | — |

Twenty-three examples of acrylic acid and methacrylic acid copolymers formed from a wide range of comonomer concentration and wide range of molecular weights were prepared and evaluated. The results of this evaluation, as illustrated in FIGS. 1 and 2, show that there exists a criticality in both monomer ratio and copolymer molecular weight to achieve effective precipitation inhibition for both calcium carbonate and calcium phosphate. Copolymers formed from a monomer ratio of acrylic acid to methacrylic acid ranging from about 30/70 to about 70/30 where the copolymer had a molecular weight of about 2000 to about 5000 provided about 90 percent inhibition of calcium phosphate. When either the monomer ratio or the copolymer molecular weight was varied slightly outside these ranges, the anti-precipitation activity of the copolymer was drastically reduced.

In order to achieve about 90 percent calcium carbonate precipitation inhibition, the molecular weight of the copolymer and the monomer ratio was not as sensitive as for effective calcium phosphate precipitation inhibition. It was found that molecular weights of at least 2000 to greater than about 6000 could be used if the monomer ratio was adjusted. Effective calcium carbonate inhibition can be generally achieved if the ratio of acrylic acid to methacrylic acid monomer is decreased as the molecular weight of the copolymer is increased. Since methacrylic acid is normally more costly that acrylic acid, the monomer ratio of acrylic acid to methacrylic acid should preferably be as high as possible.

Maximum inhibition of both calcium phosphate and calcium carbonate precipitation is achieved using a preferred copolymer having a molecular weight of from about 2000 to about 5000 ($M\overline{w}$) formed from a monomer ratio of acrylic acid to methacrylic acid from about 70/30 to about 30/70. The most preferred copolymers, in terms of cost and performance, are copolymers, formed from the above monomer ratio, having a molecular weight of about 3000 to 4000.

Therefore, by varying the range of monomer concentrations and range of copolymer molecular weights and evaluating each copolymer, an effective method for inhibiting calcium phosphate and calcium carbonate precipitation, and, therefore, scale formation in aqueous systems is achieved. The anti-precipitation method of this invention is generally applicable to any aqueous system in which scale inhibition or sequestration of hardness ions is desirable, such as in secondary oil recovery (water flooding) or for use in detergent compositions. In cooling tower applications, the copolymers may be added to the water at a concentration of about 1 to about 50 ppm and preferably at about 3 to about 15 ppm.

The technical superiority of the present method as compared to methods employing conventional scale inhibiting polymers is evidenced by the result of comparative examples 24–36. In these examples the anti-precipitation activity of low molecular weight polyacrylic acid and copolymers of acrylic acid with hydroxyethyl methacrylate, hydroxypropyl methacrylate, hydroxypropyl acrylate, and acrylamide, for calcium carbonate and calcium phosphate precipitation inhibition were determined using the same test methods described above. The results of the anti-precipitation activity of these conventional inhibitors are presented in Table 2.

TABLE 2

| Conventional Antiprecipitants - Comparative Test Results | | | | | | | |
|---|---|---|---|---|---|---|---|
| | Acrylic Acid Monomer Wt. % | Comonomer | | Copolymer $M\overline{w}$ | % Precipitation Inhibition | | |
| | | | | | Calcium Carbonate | | Calcium Phosphate |
| Example | | Type | Wt. % | | 10 ppm | 30 ppm | 7.5 ppm | 10 ppm |
| 24 | 100 | None | — | 1920 | 78 | 95 | 29 | 31 |
| 25 | 100 | None | — | 4430 | 74 | 98 | 35 | 33 |
| 26 | 75 | HEMA[1] | 25 | 2500 | 73 | 80 | 92 | 97 |
| 27 | 80 | HEMA | 20 | 4500 | 78 | 82 | 93 | 99 |
| 28 | 80 | HEMA | 20 | 1170 | — | — | — | 22 |

TABLE 2-continued

Conventional Antiprecipitants - Comparative Test Results

| Example | Acrylic Acid Monomer Wt. % | Comonomer Type | Wt. % | Copolymer $M\overline{w}$ | % Precipitation Inhibition Calcium Carbonate 10 ppm | 30 ppm | Calcium Phosphate 7.5 ppm | 10 ppm |
|---|---|---|---|---|---|---|---|---|
| 29 | 80 | HPMA[2] | 20 | 6560 | 69 | 98,81[a] | 96 | 98 |
| 30 | 80 | HPA[3] | 20 | 2540 | 80 | 83 | 99 | 100 |
| 31 | 80 | HPA | 20 | 683 | — | — | — | 23 |
| 32 | 62.4 | HPA | 37.6 | 2960 | — | 82 | 91 | — |
| 33 | 62.4 | HPA | 37.6 | 3230 | — | 84 | 91 | — |
| 34 | 60 | AM[4] | 40 | 2270 | — | 82 | 24 | 31 |
| 35 | 80 | AM | 20 | 4040 | — | 97 | 32 | — |
| 36 | 90 | AM | 10 | 4550 | — | — | 73 | 60 |

[a]The 98% precipitation inhibition value obtained is believed to be in error. A repeat test showed a value of 81% which is believed to be accurate.
[1]HEMA = Hydroxyethyl methacrylate
[2]HPMA = Hydroxypropyl methacrylate
[3]HPA = Hydroxypropyl acrylate
[4]AM = Acrylamide The low molecular weight polyacrylic acid inhibitors (Examples 24 and 25) exhibited good anti-precipitant activity for calcium carbonate but were ineffective for inhibiting calcium phosphate precipitation. The commercially available copolymers of acrylic and hydroxylated acrylates (Examples 26 and and 33) were both excellent calcium phosphate precipitation inhibitors but only fair for calcium carbonate. Other synthesized hydroxy (meth)acrylic acid copolylmers, examples 27–31, produced similar results. Copolymers of acrylic acid and acrylamide (Examples 34–36) were adequate calcium carbonate anti-precipitants but were only fair for calcium phosphate precipitation inhibition.

BARIUM SULFATE ANTI-PRECIPITATION TEST

The following test method was employed to measure the ability of acrylic acid homopolymers and copolymers and a conventional additive for inhibiting barium sulfate precipitation in aqueous systems.

To a 4 ounce jar was added 25 ml of the following solution which had been prefiltered through a 0.45 micrometer filter:

| | |
|---|---|
| 17.96 g/l | $CaCl_2$ |
| 2.04 g/l | KCl |
| 4.97 g/l | $MgCl_2.6H_2O$ |
| 76.68 g/l | NaCl |
| 0.97 g/l | $BaCl_2.2H_2O$ |
| 4.00 g/l | $SrCl_2.6H_2O$ | followed by the addition of the sample polymers in water at a concentration of 0,5 or 10 ppm. Following this, 25 ml of the following prefiltered (0.45 micrometer filter) solution was added to the jar:

| | |
|---|---|
| 76.68 g/l | NaCl |
| 2.04 g/l | KCl |
| 4.97 g/l | $MgCl_2.6H_2O$ |
| 100 g/l | $Na_2CO_3$ |

Following this 50 ml of the following synthetic seawater solution[1] was added:

| | |
|---|---|
| 27.2 g/l | NaCl |
| 8.1 g/l | $MgCl_2.6H_2O$ |
| 1.7 g/l | $MgSO_4$ |
| 1.3 g/l | $CaSO_4$ |

[1] From Composition and Properties of Oil Well Drilling Fluids, W. R. Rogers, p. 182.

The pH of the final test solutions was pH 9. The test solutions were then aged for 16, 38, 40 or 80 hours in a 70° C. oven. The samples were then cooled and filtered through a 0.45 micrometer Millipore filter. The Barium ion ($BA^{+2}$) concentration in the supernatent was then determined by atomic absorption spectrophotometry. The following is a summary of the concentration of the ions and salts in the supernatants.

| | Mg/l | ppm as $CaCo_3$ |
|---|---|---|
| $Ca^{+2}$ | 1758 | 4390 |
| $Mg^{+2}$ | 954 | 3927 |
| $Sr^{+2}$ | 329 | 376 |
| $Ba^{+2}$ | 136 | 99 |
| NaCl | 15,900 | — |
| KCl | 1,202 | — |

TABLE 3

| Example | Acrylic Acid Monomer Wt. % | Methacrylic Acid Monomer Wt. % | Polymer $M\overline{w}$ | % $BaSo_4$ Precipitation Inhibition 5 ppm (40 hours) |
|---|---|---|---|---|
| 37 | control | no polymer | — | 0 |
| 38 | 100 | — | 1000 | 2 |
| 39 | 100 | — | 2310 | 33 |
| 40 | 100 | — | 4640 | 21 |
| 41 | 69 | 31 | 3900 | 75 |
| 42 | 69 | 31 | 6100 | 94 |
| 43 | 88 | 12 | 3020 | 82 |
| 44 | 75 | 12 | 1300 | 4 |
| 45 | 50 | 50 | 1100 | 1 |
| 46 | 20 | 80 | 3620 | 8 |

These tests illustrate that polyacrylic acid homopolymers having molecular weights ranging from about 1000 to about 46000 were ineffective for barium sulfate precipitation inhibition while acrylic acid/methacrylic acid copolymers were effective in some instances. It appears that the molecular weight and composition of AA/MAA copolymers is not as critical for barium sulfate inhibition as in the case of calcium phosphate and calcium carbonate inhibition, however, if the composition or molecular weight of AA/MAA copolymers are significantly different from the AA/MAA copolymers useful for carbonate and phosphate control (examples 44-46), the barium sulfate inhibition is drastically reduced.

Additional comparative tests were also performed using the preferred AA/MAA copolymer and conventional materials used as barium sulfate inhibitors. Dequest 2060, a diethylenetriamepenta(methylene phosphonic acid) is commonly used as a barium sulfate scale inhibitor; however, the data shown in Table 4 shows the superiority of the AA/MAA copolymer as a barium sulfate scale inhibitor over both the Dequest 2060 and a polyacrylic acid homopolymer as a function of time.

TABLE 4

| Example | Acrylic Acid Monomer wt % | Methacrylic Acid Monomer wt % | Polymer $M\overline{w}$ | Inhibition (10 ppm) | | |
|---|---|---|---|---|---|---|
| | | | | 16 hours | 38 hours | 80 hours |
| 47 | 100 | — | 4640 | 90 | 87 | 66 |
| 48 | Dequest | 2060 | 573 | 64 | 66 | 58 |
| 49 | 69 | 31 | 3900 | 97 | 100 | 98 |

The low molecular weight acrylic and methacrylic acid copolymers useful for barium sulfate, calcium phosphate and calcium carbonate precipitation inhibition were also evaluated for their dispersancy activity according to the following cloud point (turbidity) test. This procedure consisted of preparing an aqueous solution containing 500 ppm $Ca(HCO_3)_2$ as calcium carbonate and 10 ppm of copolymer. Sodium hydroxide (0.05N) was added, with stirring, in 0.5 ml increments at one minute intervals until turbidity occurred. At the onset of turbidity, the pH of the solution dropped sharply as the result of the formation of calcium carbonate precipitation. Following the onset of turbidity, additional quantities of 0.05N sodium hydroxide were added so that the total NaOH added equaled 12 ml. The solution was then allowed to stand undisturbed, without stirring, for 0.5 hours. After 0.5 hours, 20 ml of the supernatant was drawn off and turbidity was measured on an HF model DRT 100 turbidimeter. The results, in nephelometric turbidity units (NTU's), are presented in Table 5.

TABLE 5

| Cloud Point Dispersancy Test | | | |
|---|---|---|---|
| Polymer | | | |
| Type | Composition | $M\overline{w}$ | Average Turbidity (NTU)[1] |
| Control | None | — | 50.5 |
| AA/MAA[2] | 69/31 | 3580 | 422 |
| AA/— | 100/— | 1920 | 327 |
| AA/HEMA[3] | 75/25 | 2500 | 183 |
| AA/HPA[4] | 62/38 | 3230 | 314 |

[1]Turbidity values presented are the average of repeat tests performed at the end of 0.5 hours.
[2]AA/MAA = Copolymer of acrylic acid (AA) and methacrylic acid (MAA)
[3]AA/HEMA = Copolymer of acrylic acid (AA) and hydroxyethyl methacrylate (HEMA)
[4]AA/HPA = Copolymer of acrylic acid (AA) and hydroxypropyl acrylate (HPA)

The results of these tests demonstrate that the acrylic acid-methacrylic acid copolymers of this invention are superior dispersants for calcium carbonate compared to polyacrylic acid and the acrylic acid-hydroxylated copolymers. This is shown by the fact that the turbidity measurement, (NTU), is highest for the acrylic acid-methacrylic acid copolymer indicating that more calcium carbonate is being dispersed in solution rather than settling from solution. Turbidity decreases as settling increases. This dispersancy test is close to actual conditions since the precipitate is being formed during the test at realistic concentrations in the presence of the polymer.

An additional dispersancy test was conducted on the preferred acrylic acid-methacrylic acid copolymer to evaluate its effect on dispersing dilute suspensions of mud and silt. In this test, a dilute suspension of kaolin clay was used to simulate the presences of silt in a cooling water system. The test procedure comprised adding 5 ppm of scale inhibitor to water containing 200 ppm calcium chloride, expressed as calcium carbonate, and 1000 ppm of Ansilex ® X-1846A kaolin, manufactured by Engelhard Minerals and Chemicals, Inc. The mixture was agitated in a Waring ® blender for 1 minute at low speed and the pH was adjusted to 7.5 with sodium hydroxide. The mixture was then poured into a 100 ml graduated cylinder and allowed to stand undisturbed for 2 hours. At the end of 2 hours, the top 20 mls of the supernatant were removed and turbidity was measured on a HF model DRT 100D turbidimeter. The results of this test are presented in Table 6.

The test results demonstrate that the acrylic acid-methacrylic acid copolymer is superior to polyacrylic acid and equivalent to a commercial acrylic acid-hydroxypropyl acrylate copolymer for dispersing small concentrations of suspended inorganic materials in aqueous systems. In contrast, an aminotrismethylene phosphonic acid polymer had little dispersant activity for kaolin, even though it is well known to be an effective anti-precipitant for hardness ion salts.

TABLE 6

| KAOLIN DISPERSANCY TEST | | | |
|---|---|---|---|
| Polymer | | | |
| Type | Composition | $M\overline{w}$ | Turbidity (NTU) |
| Control | None | — | 145 |
| AA | 100 | 2200 | 640 |
| AA | 100 | 5140 | 419 |
| AA/MAA | 69/31 | 3500 | 780 |
| AA/HPA | 62/38 | 3230 | 775 |
| AMP[1] | 100 | 299 | 211 |

[1]AMP is amino(trismethylene phosphonic acid).

Furthermore, low molecular weight, acrylic acid-methacrylic acid copolymers are also effective for dispersing concentrated kaolin and calcium carbonate slurries.

Kaolin clays and calcium carbonate are used in plastics, rubber, and paper as fillers, as pigments in paint and rubber, and to provide brightness and gloss to paper coatings. In many of these applications, and in paper coatings in particular, the kaolin and calcium carbonate are shipped, stored, and applied as aqueous slurries containing high solids content. Kaolin slurries typically contain 60 to 70% solids, having particle sizes of about 2 microns or less in diameter, while calcium carbonate slurries typically contain about 60 to 75% or more solid calcium carbonate.

These non-dispersed slurries typically have viscosities in excess of 50,000 centipoise. In order to handle high solids slurries, the viscosity of the slurry should be reduced to as low as possible to permit pumping and spraying and to maintain the ability of the slurry to flow even after extended storage. Dispersants are selected based on their cost of manufacture and upon the lowest concentration of the dispersant in the slurry which is effective for reducing the viscosity of the slurry. Polyacrylic acid is an effective dispersant for high solids kaolin and calcium carbonate slurries.

Conventional polyacrylic acid polymers and the preferred acrylic acid-methacrylic acid copolymer of this invention were prepared and evaluated for their effectiveness as dispersants for high solids content kaolin and calcium carbonate slurries. The tests employed are described in detail below.

HIGH CALCIUM CARBONATE SLURRY DISPERSION TEST

Into a 1 liter stainless steel mixing cup was added 1.88 grams of 10% dispersant polymer or copolymer solution (pH approximately 7.0) and 123.12 grams deionized water. To this solution was added 375 grams Snowflake White calcium carbonate, manufactured by Thompson Weinman & Company, to form a slurry. The slurry was mixed for 15 minutes. Four hundred and fifty grams of the slurry were removed from the cup and added to a one-pint jar. The jar was capped and shaken gently until the slurry cooled to room temperature. The viscosity of the slurry was then measured (Brookfield RV viscometer at 20 rpm) and the pH of the slurry was recorded. Following this, 0.84 grams of the 10% dispersant solution and 0.63 grams calcium carbonate were added to the slurry in the jar to increase the dispersant concentration by 0.025 weight percent while maintaining the calcium carbonate solids content at 75%. The new slurry was mixed and the viscosity was then measured. The concentration of the dispersant in the slurry was raised again by 0.025 weight percent while maintaining the calcium carbonate solids content at 75%, as described above, and the viscosity was remeasured. The results of the tests are illustrated in Table 7.

TABLE 7
Calcium Carbonate Slurry Viscosity

| Polymer Concentration (Wt. % Based on CaCO$_3$) | Brookfield Viscosity (cps) at 20 RPM | | |
|---|---|---|---|
| | PAA[1] | PAA 2 | AA/MAA[3] |
| 0.050 | 5250 | 3045 | 4737 |
| 0.075 | 600 | 300 | 488 |
| 0.100 | 390 | 230 | 340 |
| pH | 9.2 | 9.22 | 9.00 |

[1]PAA is polyacrylic acid having $\overline{Mw}$ 3000, and $\overline{Mn}$ 1600.
[2]PAA is DISPEX N-40 polyacrylic acid, manufactured by Allied Colloids, Ltd., having $\overline{Mw}$ 3300 and $\overline{Mn}$ 2200.
[3]AA/MAA is acrylic acid-methacrylic acid copolymer, 69/31 weight percent, having $\overline{Mw}$ 3500, $\overline{Mn}$ 1900.

The acrylic acid-methacrylic acid copolymer was found to be an effective dispersant for high solids content calcium carbonate slurries at concentrations of 0.050 to 0.100 weight percent based on calcium carbonate.

HIGH KAOLIN SLURRY DISPERSION TEST

Into a 1 liter stainless steel mixing cup was added 6.13 grams of a 10% dispersant polymer solution (pH 7.0), 4.66 grams of 20% Na$_2$CO$_3$ solution and a 50/50 mixture of deionized water and tap water to bring the aqueous solution to 210 grams. To this dispersant solution was added 490 grams of Astra Glaze® kaolin clay, manufactured by Georgia Kaolin, Inc., with low speed mixing to form a slurry. The slurry was then mixed for 15 minutes at high speed. Five hundred grams of the slurry were then removed from the cup and placed in a one-pint jar. The jar was capped and shaken gently until the slurry cooled to room temperature. The slurry viscosity was then measured on a Brookfield RV viscometer at 20 rpm and the pH was recorded. Following this, 0.88 grams of the 10% polymer solution and 2.05 grams of clay were added to the slurry in the jar to raise the dispersant level 0.025 weight percent while maintaining the clay solids at 70%. The new slurry was mixed for 2 minutes and the viscosity and pH was measured. This step was repeated as described above and the results of the tests are illustrated in Table 8.

TABLE 8
Kaolin Slurry Viscosity

| Polymer Concentration (Wt. % Based on Kaolin) | Brookfield Viscosity (cps) at 20 RPM | | | | |
|---|---|---|---|---|---|
| | PAA[1] | PAA[2] | PAA[3] | PAA[4] | AA/MAA[5] |
| 0.125 | 738 | 580 | 430 | 476 | 297 |
| 0.150 | 318 | 500 | 281 | 292 | 276 |
| 0.175 | 310 | 370 | 284 | 281 | 278 |
| 0.200 | 355 | 340 | 311 | 328 | 310 |

[1]PAA = polyacrylic acid, $\overline{Mw}$ 4200, $\overline{Mn}$ 2600.
[2]PAA = polyacrylic acid, $\overline{Mw}$ 3000, $\overline{Mn}$ 1600.
[3]PAA = DISPEX N-40, polyacrylic acid manufactured by Allied Colloids, Inc., having $\overline{Mw}$ 3300, $\overline{Mn}$ 2200.
[4]PAA = Colloid 211, polyacrylic acid manufactured by Colloids, Ltd., having $\overline{Mw}$ 3300 and $\overline{Mn}$ 2200.
[5]AA/MAA = acrylic acid-methacrylic acid copolymer, 69/31 weight percent, having $\overline{Mw}$ 3500, $\overline{Mn}$ 1900.

The acrylic acid-methacrylic acid copolymer was found to be an effective dispersant for high solids content kaolin slurries.

THERMAL STABILITY

The thermal stability of the preferred copolymers of acrylic acid and methacrylic acid was evaluated and compared to the thermal stability of the conventional acrylic acid-hydroxylated acrylic acid copolymers by the following test method.

The copolymer was diluted with deionized water to form a solution containing 0.1% copolymer, and the pH was adjusted to pH 12 with the addition of sodium hydroxide. About 40 ml of the diluted, and pH adjusted, copolymer solution was placed in a four ounce polyethylene bottle which was then loosely capped. The polyethylene bottle was placed in an eight ounce jar which was then inserted into a pressure bomb. About 20 ml of deionized water was placed into the bomb to assist in equalizing water vapor pressure during subsequent heating. The bomb was then pressurized with 400 psig nitrogen gas to minimize vaporization of the water in the sample. The pressurized bomb was then placed in an oven and heated to 400° F. for four hours.

The solution was tested for calcium phosphate precipitation inhibition, as described above herein, both before and after heating.

The results of this test on the preferred acrylic acid-methacrylic acid copolymer and on conventional copolymers of acrylic acid-hydroxyethyl methacrylate, and acrylic acid-hydroxypropyl acrylate are presented in Table 9.

TABLE 9
Thermal Stability Evaluation Test

| Polymer | Composition | $\overline{Mw}$ | Average % Calcium Phosphate Inhibition | |
|---|---|---|---|---|
| | | | Before Heating | After Heating |
| AA/MAA | 69/31 | 3900 | 93 | 95 |
| AA/HEMA | 75/25 | 3800 | 95 | 80 |
| AA/HPA | 62/38 | 3500 | 98 | 26 |

This test demonstrates that the conventional acrylic acid-hydroxylated copolymers, which are effective for calcium phosphate precipitation inhibition in cooling towers, are hydrolytically unstable at high temperatures and high pH. The preferred acrylic acid-methacrylic acid copolymers used in the present invention are effective scale inhibitors and are hydrolytically stable. The acrylic acid-methacrylic acid copolymers contain no hydrolyzable groups and therefore maintain their excellent calcium phosphate precipitation inhibition in both cooling tower water and more severe operations, such as internal boiler water treatment. Molecular weight determinations by GPC performed both before and after heating show very little molecular weight loss in any of the three copolymers. The acrylic acid-hydroxyethyl methacrylate acid copolymer (AA/HEMA), if completely hydrolyzed, yields an acrylic acid-methacrylic acid copolymer with a ratio of acrylic acid to methacrylic acid of 81/19 which, based on the data presented in Table 1, would be expected to result in about 80% calcium phosphate inhibition. The acrylic acid-hydroxypropyl acrylate (AA/HPA) copolymer, if completely hydrolyzed, would be expected to result in a homopolymer of polyacrylic acid, and the 26% inhibition is consistent with the data for polyacrylic acid presented in Table 2.

While the method of this invention for controlling scale formation, precipitation inhibition, and the dispersion of inorganic materials has been described and exemplified in detail herein, various modifications, alterations, and changes should become readily apparent to those skilled in this art without departing from the spirit and scope of the invention. These modifications may include the blending of the acrylic acid copolymers described herein with other conventional additives to achieve additional benefits. For example, the acrylic acid copolymers may be blended with sulfonated styrene-maleic anhydride copolymers for improved iron dispersion, organic phosphonates for scale control, defoamers, biodispersants, corrosion inhibitors, and the like.

What is claimed is:

1. A method for controlling hardness ion salt scale formation, where said anions of said salt include phosphate, in an aqueous system comprising adding a scale-inhibiting amount of a low molecular weight, water-soluble copolymer to said system to inhibit the precipitation of said hardness ion salts and to disperse precipitated hardness ion salts in said system, said copolymer being an acrylic acid-methacrylic acid copolymer formed from about 30 to about 70 weight percent acrylic acid and about 70 to about 30 weight percent methacrylic acid, and where said copolymer has a weight average molecular weight of from about 2000 to about 5000.

2. The method of claim 1 where said copolymer comprises about 70 weight percent acrylic acid and about 30 weight percent methacrylic acid and said copolymer has a weight average molecular weight of from about 3000 to about 4000.

3. The method of claim 1 where said aqueous system is a cooling tower.

4. The method of claim 1 where said aqueous system is a boiler.

5. An improved method for controlling the precipitation and formation of a variety of hardness ion salt scale, wherein said salts include barium sulfate, in aqueous systems comprising adding a scale-inhibiting amount of an acrylic acid-methacrylic acid copolymer to said aqueous systems where the improvement comprises adding an acrylic acid-methacrylic acid copolymer, formed from about 30 to about 70 weight percent acrylic acid and from about 70 to about 30 weight percent methacrylic acid and having a weight average molecular weight of from about 2000 to about 5000 to an aqueous system containing said hardness ion salts.

6. A method for dispersing suspended inorganic particulate materials selected from the group consisting of mud, slit, clay and common hardness ion salts in water comprising adding a dispersing amount of a low molecular weight copolymer to sdid system, said copolymer being an acrylic acid-methacrylic acid copolymer formed from about 30 to about 70 weight percent acrylic acid and from about 70 to about 30 weight percent methacrylic acid, and where said copolymer has a weight average molecular weight of from about 2000 to about 5000.

7. The method of claim 6 where said copolymer is formed from about 70 weight percent acrylic acid and from about 30 weight percent methacrylic acid, and where said copolymer has a weight average molecular weight of about 3500.

8. A method for dispersing an aqueous slurry containing a high solids concentration of calcium carbonate comprising adding a dispersing amount of a low molecular weight copolymer to said slurry, said copolymer being an acrylic acid-methacrylic acid copolymer formed from about 70 weight percent acrylic acid and from about 30 weight percent methacrylic acid, and where said copolymer has a weight average molecular weight of about 3500.

9. The method of claim 8 where said concentration of calcium carbonate in said slurry is at least 75 weight percent.

10. A method for dispersing an aqueous slurry containing a high solids concentration of kaolin comprising adding a dispersing amount of a low molecular weight copolymer to said slurry, said copolymer being an acrylic acid-methacrylic acid copolymer formed from about 70 weight percent acrylic acid and from about 30 weight percent methacrylic acid, and where said copolymer has a weight average molecular weight of about 3500.

11. The method of claim 10 where said concentration of kaolin in said slurry is at least 70 weight percent.

* * * * *